Aug. 13, 1963 A. W. FREDERICK 3,100,320
INTERIOR TRIM FOR WINDOWS
Filed March 20, 1961 2 Sheets-Sheet 2

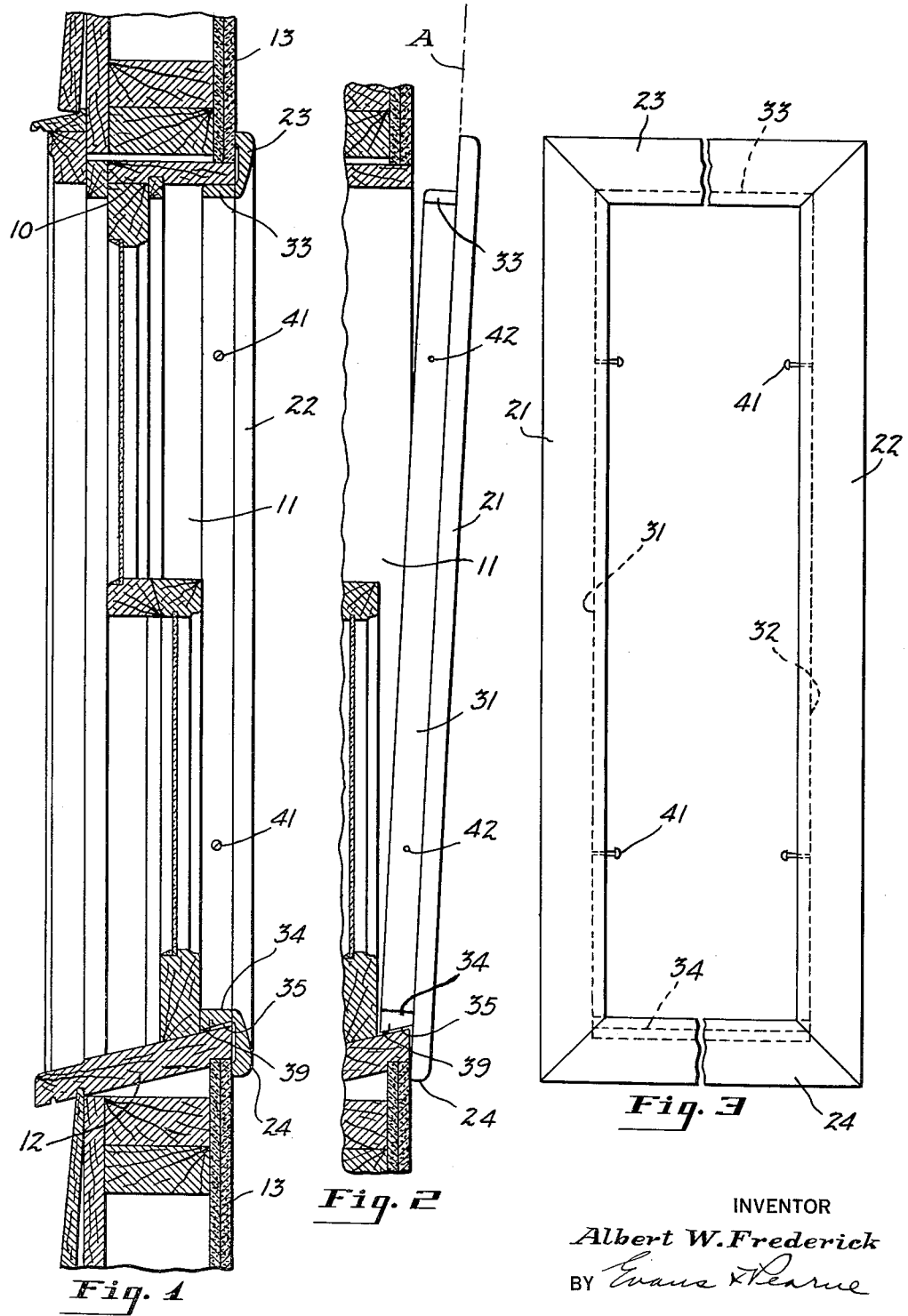

INVENTOR
Albert W. Frederick
BY Evans & Hearne
ATTORNEYS 3,100,320
INTERIOR TRIM FOR WINDOWS
Albert W. Frederick, % The Lumberman's Door & Trim
Co., P.O. Box 107, Bedford, Ohio
Filed Mar. 20, 1961, Ser. No. 96,916
2 Claims. (Cl. 20—11)

This invention relates to preassembled or one-piece interior trim for finishing windows of double-hung or other types wherein as is conventional construction practice, frame members bottomed by an outwardly sloping sill are provided for the reception of the working portion of the window, the frame members requiring an inside finish or trim in order to dress the appearance of the window face as it is viewed from the interior of the building, and particularly to cover unsightly joints and cracks between the wall and the window frame.

Interior trim is usually fabricated on the job although from time to time preassembled or one-piece interior trim frames have been marketed by lumber companies and similar building trade outlets. However, such one-piece interior trim structures have had disadvantages of high manufacturing cost, poor adaptability to the wide dimensional tolerances inherent in rough carpentry, and inconvenience and therefore high labor cost of field installation. Since the great appeal of preassembled trim is the expectation of reduced costs, without reduced quality, the above disadvantages are significant.

The present invention overcomes these disadvantages of prior one-piece window interior trim. The invention provides a one-piece interior trim which can be very conveniently installed in the field and which assures an adequate fit in installed position despite the variations in framing-in dimensions which are encountered in field carpentry.

The invention contemplates providing a trim frame including a sill stop or stool having a sloped lower face related in a certain way to the sill of the window frame and to the other dimensions of the one-piece window trim itself. In one important aspect, weatherstripping is combined with the stool. These features are more particularly described below.

The objects, advantages, and features of the invention will be more readily apparent from the following exemplary description of one embodiment of the invention.

In the drawings:

FIGURE 1 is a vertical section through a typical window and window frame together with adjacent wall structure and showing a one-piece window interior trim in installed condition.

FIGURE 2 is a view similar to FIGURE 1 but with much of the window and wall structure removed and showing the one-piece window interior trim of FIGURE 1 in the process of being installed. Also the one-piece interior trim itself is not shown in section, as it is in FIGURE 1.

FIGURE 3 is a fragmentary front elevation of the trim shown in FIGURES 1 and 2.

Figure 4:
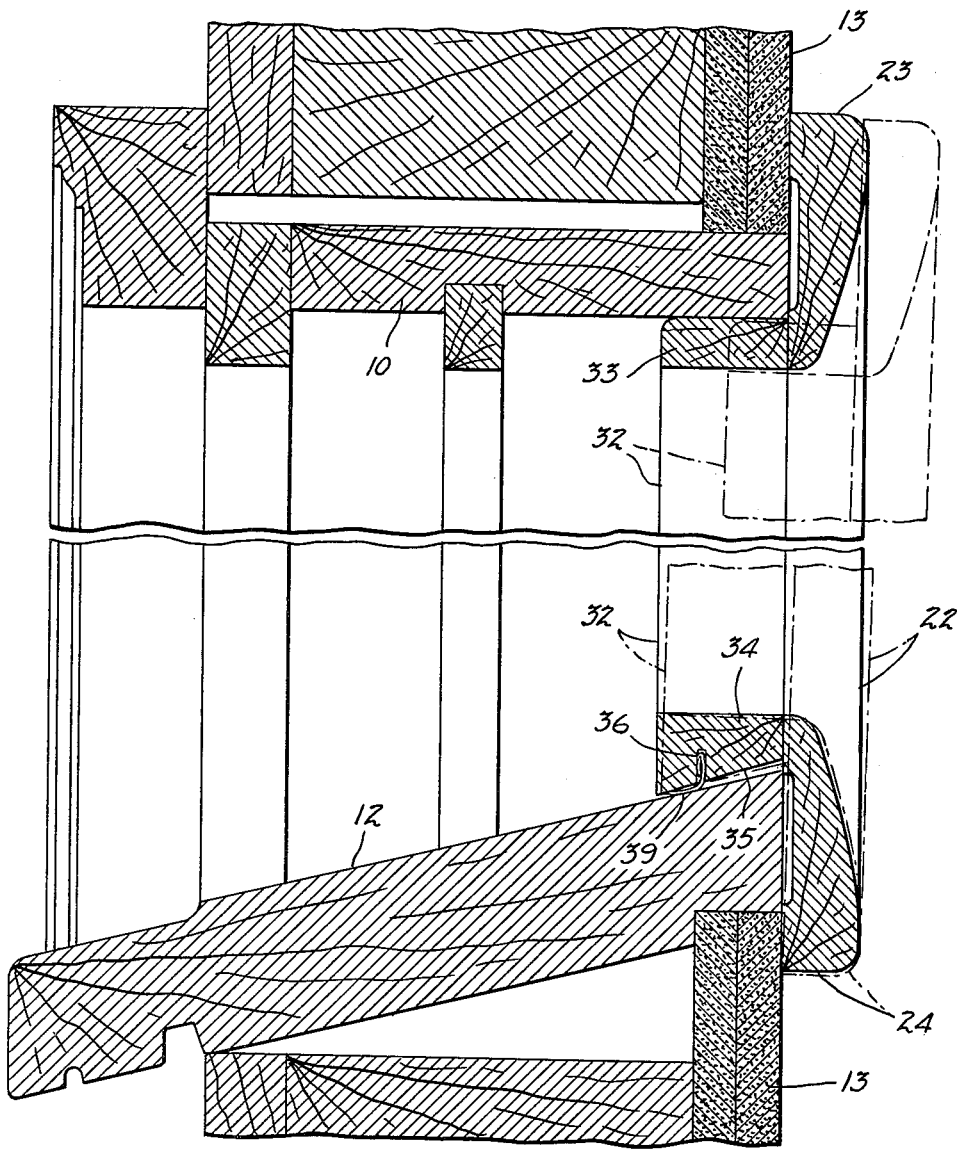
FIGURE 4 is a fragmentary sectional view illustrating portions of FIGURE 1 on an enlarged scale.

The typical window cross-section shown in FIGURE 1 includes window frame structure comprising a top frame member 10 and side frame members 11. Only one of the side frame members 11 may be seen in FIGURE 1. The window frame structure also comprises a sill 12 extending outwardly downwardly at a given slope, say 14°, with respect to a horizontal plane normal to the face plane of the wall 13 through which the window opens.

The facing trim members of the one-piece interior trim comprise two jamb members 21 and 22 joined at their tops by a lintel member 23 and at their bottom by an apron 24. The corner joints between the facing trim members preferably comprise mitered joints as shown in FIGURE 3. These joints may be fastened by wood screws (not shown). The reverse sides of the facing trim members 21—24 lie in a plane A (see FIGURE 2) which in the mounted condition is the face plane of the wall 13.

Figure 5:
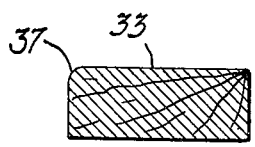
FIGURE 5 illustrates a cross-section which is typical of the stops associated with the lintel and jamb members of the illustrated trim.

Each of the facing trim members has its own stop member. Thus the stop members 31—34 are associated respectively with the facing trim members 21—24 and may be joined thereto by staples (not shown). The corner joints between the stop members need not be mitered. These corners are joined by suitable fastening means such as nails or staples (not shown). A typical cross-section of the stop members 31—33 is shown in FIGURE 5. The outside edge remote from the associated facing trim member is slightly relieved or rounded as shown at 37 in FIGURE 5 in order to ease the insertion of the stop members within the window frame proper.

The sill stop or stool 34 has a bottom face 35 which lies in a plane which inclines downwardly from the lower front edge to lower rear edge of this stop member. The slope of the plane in which the bottom face 35 lies is slightly greater than the slope of the sill 12. If the sill 12 has a slope of say 14° then the bottom face 35 may have a slope of say 16° with respect to a horizontal plane normal to the face plane of the mounting wall 13.

The outer side faces of the stop members 31 and 32 and the top face of the stop member 33 lie in planes normal to the face plane of the mounting wall 13.

Figure 6:
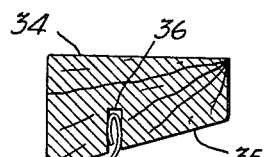
FIGURE 6 is a cross-section of the sill stop or stool of the illustrated trim.

According to one important aspect of the invention, weatherstripping is provided in the bottom face 35 of the sill stop or stool 34. A saw-cut such as the saw-cut 36 shown in FIGURE 6 extends into the bottom face 35 and extends along the length of the stool 34. Weatherstripping 39 is received in the saw-cut and protrudes below the bottom face 35 as shown in the drawings and particularly FIGURES 4 and 6. Preferably the weatherstripping is of the so-called snap-in type, as illustrated.

When the one-piece trim is installed as illustrated in the sequence from FIGURE 2 to FIGURE 1 and also as illustrated in the sequence from the phantom views to the solid line views of the trim elements in FIGURE 4, the sill stop or stool 34 is first inserted with the lintel trim 23 and associated stop 33 spaced slightly outwardly from the window frame as shown in FIGURE 2. Then when the lintel elements 23 and 33 are forced home, the one-piece trim assembly pivots or hinges on the relatively low rear edge of the face 35 of the sill stop 34, this rear edge being hingedly supported on the sill 12. During such hinging and as the lintel elements 23 and 33 approach their fully seated position, the lintel stop element 33 rises to finally seat snugly against the top window frame element 10 as perhaps most clearly illustrated in FIGURE 4.

The screws 41 (see FIGURE 1) are provided which are only started into screw holes 42 (see FIGURE 2) formed toward the top and bottom of each of the stop members 31 and 32. When the trim assembly is in installed position, the screws 41 are turned down to fasten the trim to the frame.

It is not intended to restrict the invention to structures which are slavish imitations of each and every detail of the above disclosure.

What is claimed is:

1. One-piece window interior trim for a window frame having a sill extending outwardly downwardly at a given slope with respect to a horizontal plane normal to the face plane of the wall through which said window opens, said one-piece interior trim comprising facing trim members including two jamb members joined at their tops by a lintel member and at their bottoms by an apron, the reverse sides of said facing trim members lying in a plane which in the mounted condition is the face plane of the mounting wall, each of said facing trim members having its own stop member, each of said stop members extending along the reverse side of its associated facing trim member adjacent the inner edge thereof, the stop member associated with said apron comprising a stool having a bottom face which lies in a plane which inclines downwardly from the lower front edge to the lower rear edge of said stool at a slope which, with respect to a horizontal plane normal to the face plane of the mounting wall, is slightly greater than said given slope, the top face of the stop member associated with said lintel member and the outer side faces of the stop members associated with said jamb members lying in planes normal to said face plane, a saw-cut extending partly into said bottom face between said lower front edge and said lower rear edge and extending along the length of said stool, and weatherstrip received in said saw-cut and protruding below said bottom face.

2. One-piece window interior trim for a window frame having a sill extending outwardly downwardly at a given slope with respect to a horizontal plane normal to the face plane of the wall through which said window opens, said one-piece interior trim comprising facing trim members including two jamb members joined at their tops by a lintel member and at their bottoms by an apron, each of said facing trim members having its own stop member, each of said stop members extending along the reverse side of its associated facing trim member adjacent the inner edge thereof, the stop member associated with said apron comprising a stool having a bottom face which lies in a plane which inclines downwardly from the lower front edge to the lower rear edge of said stool at a slope which, with respect to a horizontal plane normal to the face plane of the mounting wall, is slightly greater than said given slope, a saw-cut extending partly into said bottom face between said lower front edge and said lower rear edge and extending along the length of said stool, and weatherstrip received in said saw-cut and protruding below said bottom face.

References Cited in the file of this patent
UNITED STATES PATENTS

| | | |
|---|---|---|
| 1,899,330 | Hortman | Feb. 23, 1933 |
| 2,666,234 | Lester | Jan. 19, 1954 |